United States Patent
Haney

(10) Patent No.: US 9,595,772 B2
(45) Date of Patent: Mar. 14, 2017

(54) ADJUSTABLE BONDING WASHER

(71) Applicant: Hubbell Incorporated, Shelton, CT (US)

(72) Inventor: Harley Alan Haney, Gurnee, IL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 14/863,781

(22) Filed: Sep. 24, 2015

(65) Prior Publication Data

US 2016/0013568 A1  Jan. 14, 2016

Related U.S. Application Data

(63) Continuation of application No. 14/533,703, filed on Nov. 5, 2014, now abandoned, which is a continuation of application No. 13/844,023, filed on Mar. 15, 2013, now Pat. No. 8,888,431.

(51) Int. Cl.

| | | |
|---|---|---|
| F16B 43/02 | (2006.01) | |
| H01R 4/26 | (2006.01) | |
| H01R 9/16 | (2006.01) | |
| H01R 43/027 | (2006.01) | |
| H02S 20/23 | (2014.01) | |
| F16B 43/00 | (2006.01) | |
| H01L 31/042 | (2014.01) | |

(52) U.S. Cl.
CPC ............. *H01R 4/26* (2013.01); *F16B 43/00* (2013.01); *H01R 9/16* (2013.01); *H01R 43/027* (2013.01); *H02S 20/00* (2013.01); *H02S 20/23* (2014.12); *Y02B 10/12* (2013.01); *Y02E 10/50* (2013.01); *Y10T 29/49208* (2015.01)

(58) Field of Classification Search
CPC ....... F16B 43/005; F16B 43/007; F16B 43/02
USPC .................................................. 411/163, 539
See application file for complete search history.

(56) References Cited

U.S. PATENT DOCUMENTS

| | | |
|---|---|---|
| 325,235 A | 9/1885 | Bulmer |
| 329,615 A | 11/1885 | Andrews |
| 554,431 A | 2/1896 | White |
| 647,928 A | 4/1900 | Adams |

(Continued)

FOREIGN PATENT DOCUMENTS

| | | |
|---|---|---|
| FR | 769005 A | 8/1934 |
| FR | 49768 E | 7/1939 |
| JP | H06309640 A | 11/1994 |

OTHER PUBLICATIONS

Wiley Index of WEEB Datasheets, Wiley Electronics LLC 2011.

(Continued)

*Primary Examiner* — Roberta Delisle
(74) *Attorney, Agent, or Firm* — Michael Best & Friedrich, LLP

(57) ABSTRACT

An adjustable bonding washer for placement between two metal pieces to create an electrical bond between them. The bonding washer has two metallic parts constrained to slide relative to one another along an axis. Each part has oppositely directed teeth that are forcibly embedded into the metal pieces to make electrical contact with them when they are rigidly clamped together. Adjustability enables the bonding washer to be mated with metal pieces having a range of widths and profiles, such as the slotted rails used to support arrays of photovoltaic panels.

10 Claims, 4 Drawing Sheets

(56) References Cited

U.S. PATENT DOCUMENTS

| | | |
|---|---|---|
| 878,476 A | 2/1908 | Barker |
| 1,151,131 A | 8/1915 | Starliper |
| 1,183,174 A | 5/1916 | Dice |
| 1,191,565 A | 7/1916 | Chambers |
| 1,288,973 A | 12/1918 | Osborn |
| 1,452,492 A | 4/1923 | Carpenter |
| 1,721,363 A | 7/1929 | Wesp |
| 1,724,595 A | 8/1929 | Hyle |
| 1,878,199 A | 9/1932 | Stenger |
| 1,904,296 A | 4/1933 | Royse |
| 1,916,526 A | 7/1933 | Olson |
| 1,937,818 A | 12/1933 | French |
| 2,034,258 A | 3/1936 | Hausser |
| 2,034,494 A | 3/1936 | Stoll |
| 2,069,402 A | 2/1937 | Cowlin |
| 2,149,359 A | 3/1939 | Olson |
| 2,179,575 A | 11/1939 | Hosking |
| 2,192,165 A | 2/1940 | Caldwell |
| 2,250,280 A | 7/1941 | Starbird |
| 2,271,732 A | 2/1942 | Chappuis |
| 2,561,679 A | 7/1951 | Waller |
| 2,796,457 A | 6/1957 | Stinger |
| 2,934,684 A | 4/1960 | Fegan |
| 3,138,658 A | 6/1964 | Weimer, Jr. |
| 3,175,462 A | 3/1965 | Disley |
| 3,247,316 A | 4/1966 | Weimer, Jr. |
| 3,253,247 A | 5/1966 | Vos |
| 3,285,313 A | 11/1966 | Blakesley |
| 3,340,494 A | 9/1967 | Gutshall |
| 3,388,369 A | 6/1968 | Zalmans |
| 3,481,381 A | 12/1969 | Black |
| 3,504,101 A | 3/1970 | Muto |
| 3,541,226 A | 11/1970 | Cea et al. |
| 3,541,227 A | 11/1970 | Bendrick |
| 3,626,357 A | 12/1971 | Kindell |
| 3,715,705 A | 2/1973 | Kuo |
| 3,719,919 A | 3/1973 | Tibolla |
| 3,761,867 A | 9/1973 | Churla |
| 3,810,069 A | 5/1974 | Jaconette, Jr. |
| 4,022,262 A | 5/1977 | Gunn |
| 4,023,882 A | 5/1977 | Pettersson |
| RE29,752 E * | 9/1978 | Jaconette, Jr. ........ F16B 37/041 411/913 |
| 4,256,359 A | 3/1981 | Storck |
| 4,263,474 A | 4/1981 | Tennant |
| 4,291,934 A | 9/1981 | Kund |
| 4,406,505 A | 9/1983 | Avramovich |
| 4,473,714 A | 9/1984 | Brownell et al. |
| 4,495,515 A | 1/1985 | Pamiello |
| 4,498,715 A | 2/1985 | Peppler |
| 4,560,224 A | 12/1985 | Weisenburger |
| 4,659,870 A | 4/1987 | Jones |
| 4,704,058 A | 11/1987 | Crunwell |
| 4,875,876 A | 10/1989 | O'Loughlin |
| 4,900,209 A | 2/1990 | Reynolds |
| 4,961,712 A | 10/1990 | Schwenk et al. |
| 5,078,613 A | 1/1992 | Salmon |
| 5,100,506 A | 3/1992 | Sturtevant et al. |
| 5,106,252 A | 4/1992 | Shapton |
| 5,135,165 A | 8/1992 | Greenhow |
| 5,207,588 A | 5/1993 | Ladouceur et al. |
| 5,236,272 A | 8/1993 | Hibbard |
| 5,378,171 A * | 1/1995 | Czerlanis ............... H01R 11/20 439/417 |
| 5,399,098 A | 3/1995 | Marshall et al. |
| 5,435,748 A | 7/1995 | Abe |
| 5,441,417 A | 8/1995 | Ladouceur et al. |
| 5,453,027 A | 9/1995 | Buell et al. |
| 5,501,008 A | 3/1996 | Leeb |
| 5,620,290 A | 4/1997 | Homfeldt et al. |
| 5,644,830 A | 7/1997 | Ladouceur et al. |
| 5,828,008 A | 10/1998 | Lockwood et al. |
| 5,921,737 A | 7/1999 | Ibey |
| 6,102,750 A | 8/2000 | Little et al. |
| 6,297,447 B1 | 10/2001 | Burnett et al. |
| 6,343,904 B1 | 2/2002 | Wang |
| 6,347,915 B1 | 2/2002 | Balzano |
| 6,368,038 B1 | 4/2002 | Uno |
| 6,488,461 B1 | 12/2002 | Zacharias et al. |
| 6,939,097 B2 | 9/2005 | Carr et al. |
| 6,976,816 B2 | 12/2005 | Slesinski et al. |
| 6,987,660 B2 | 1/2006 | Stevenson et al. |
| 7,749,256 B2 | 7/2010 | Farris et al. |
| 8,092,129 B2 | 1/2012 | Wiley et al. |
| 8,900,005 B2 * | 12/2014 | Taylor .................... H01R 4/245 439/417 |
| 2003/0031526 A1 | 2/2003 | Grant |
| 2008/0014046 A1 | 1/2008 | Bauer |
| 2008/0053517 A1 | 3/2008 | Plaisted et al. |
| 2010/0095492 A1 | 4/2010 | Boone |
| 2011/0085875 A1 * | 4/2011 | Aftanas .................. F16B 7/187 411/347 |
| 2011/0123297 A1 | 5/2011 | Tang |
| 2012/0201601 A1 | 8/2012 | Rizzo |
| 2012/0315785 A1 * | 12/2012 | Taylor .................... H01R 43/01 439/389 |

OTHER PUBLICATIONS

Wiley WEEB Lug Datasheet, Bumdy LLC 2012.
Wiley WEEB DP&W Solar Power FAB CRS Installation Instructions, Wiley Electronics LLC 2006-2010.
Wiley WEEB Solar Liberty Smart Raxx Installation Instructions, Wiley Electronics LLC 2006-2009.
Bumdy/Wiley WEEB-PMC Bonding Washer Installation Instructions, Bumdy LLC 2012.
Bumdy/Wiley WEEB-CMC Bonding Washer Installation Instructions, Bumdy LLC 2012.

\* cited by examiner

ADJUSTABLE BONDING WASHER

CROSS-REFERENCE TO RELATED APPLICATION

This application is a continuation of U.S. patent application Ser. No. 14/533,703, filed Nov. 5, 2014 (now abandoned), which is a continuation of U.S. patent application Ser. No. 13/844,023, filed Mar. 15, 2013 (now U.S. Pat. No. 8,888,431), the entire contents of which are incorporated herein by reference.

FIELD OF THE INVENTION

The invention relates to the assembly of photovoltaic arrays and other apparatus requiring electrical connection between metal parts.

BACKGROUND OF THE INVENTION

U.S. Pat. No. 8,092,129 to Wiley, et al., which is incorporated by reference herein in its entirety, discloses a variety of bonding washer configurations for creating an electrical bond between metal pieces that are to be mechanically fastened together, such as photovoltaic panels and their supporting aluminum rails. Many of these bonding washers and their commercial counterparts and variants have oppositely directed teeth designed to penetrate the anodic coatings of the metal pieces when clamped together. Some have features that retain them in position on one metal piece to facilitate assembly with another metal piece. In some embodiments the teeth are positioned to engage the metal pieces near their fastener holes, while in others the teeth are positioned to engage the metal pieces near their outer edges. Typically, these bonding washers are designed to be compatible with specific metal piece profiles and/or widths.

SUMMARY OF THE INVENTION

The adjustable bonding washer of the invention has enhanced versatility afforded by its two relatively movable parts, each of which carries oppositely directed teeth that engage the metal pieces when fastened together. The bonding washer of the invention thus can be mated with metal pieces having a range of widths and profiles and is especially useful when clamping solar panels to slotted support rails, which typically retain sliding nuts in their slots. The invention also covers a method of electrically bonding two metal pieces using such a bonding washer.

An adjustable bonding washer (assembly) according to the invention thus comprises first and second metallic parts each having at least one pair of oppositely directed external teeth formed thereon, the parts being slidable relative to each other along an axis and substantially constrained from relative off-axis movement by axially extending guide surfaces formed thereon.

Each part preferably comprises a substantially flat sheet metal body. The guide surfaces preferably comprise two opposite edges of the first part and bent edges at two opposite sides of the second part that lie close to the opposite edges of the first part when the parts are assembled. Each of the bent edges preferably comprises a folded-over marginal body portion defining a channel in which the first part can slide. Each part may have a fastener opening therethrough for accommodating a fastener that would pass between the channels. Each pair of external teeth preferably comprises a pair of substantially aligned, diverging teeth.

Also preferred is the inclusion of least one protrusion (e.g., an internal tooth) in each channel formed on at least one of the parts and adapted to engage the other part when the parts are assembled. The first part preferably has axially spaced features such as notches engageable by the protrusion, such features and the protrusion being configured to resist axial separation of the parts once they are assembled. Each part may have a bent-out alignment tab at an axial end thereof, the alignment tabs being disposed at opposite ends of the bonding washer when the parts are assembled.

The method according to the invention of electrically bonding first and second metal pieces comprises the steps of:
(a) providing an adjustable bonding assembly comprising first and second metallic parts slidable relative to each other along an axis, each part having a primary face with at least one integral projecting tooth and an opposite secondary face with at least one integral projecting tooth;
(b) placing the first part against the first metal piece such that the external tooth/teeth of the primary side contacts the first metal piece;
(c) sliding the second part toward the first part so that the external tooth/teeth of the primary side of the second part contacts the first metal piece;
(d) placing the second metal piece against the bonding assembly so that it contacts the tooth/teeth of the secondary side of each part; and
(e) clamping the metal pieces together with the bonding assembly between them so that the teeth are forcibly embedded into the metal pieces to make electrical contact therewith.

BRIEF DESCRIPTION OF THE DRAWING

Preferred embodiments of the disclosed invention are described in detail below purely as examples, with reference to the accompanying drawing, in which.

DETAILED DESCRIPTION OF THE INVENTION

As used in this application, terms such as "front," "rear," "side," "top," "bottom," "above," "below," "upwardly" and "downwardly" are intended to facilitate the description of the invention and are not to be construed as limiting the structure of the invention to any particular position or orientation.

Figure 1:
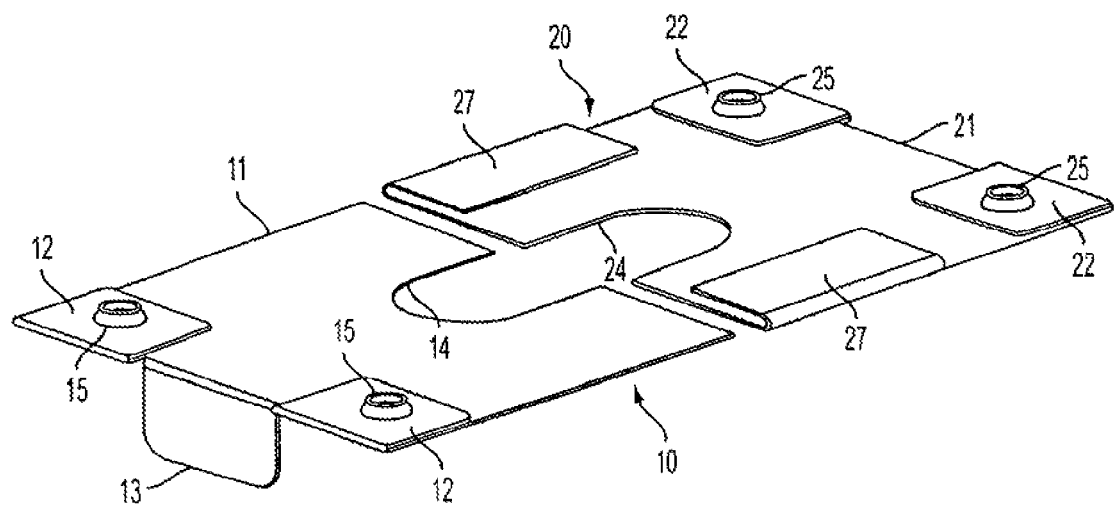
FIG. 1 is a top perspective view of a bonding washer according to the invention, showing its male and female parts unmated.
Figure 2:
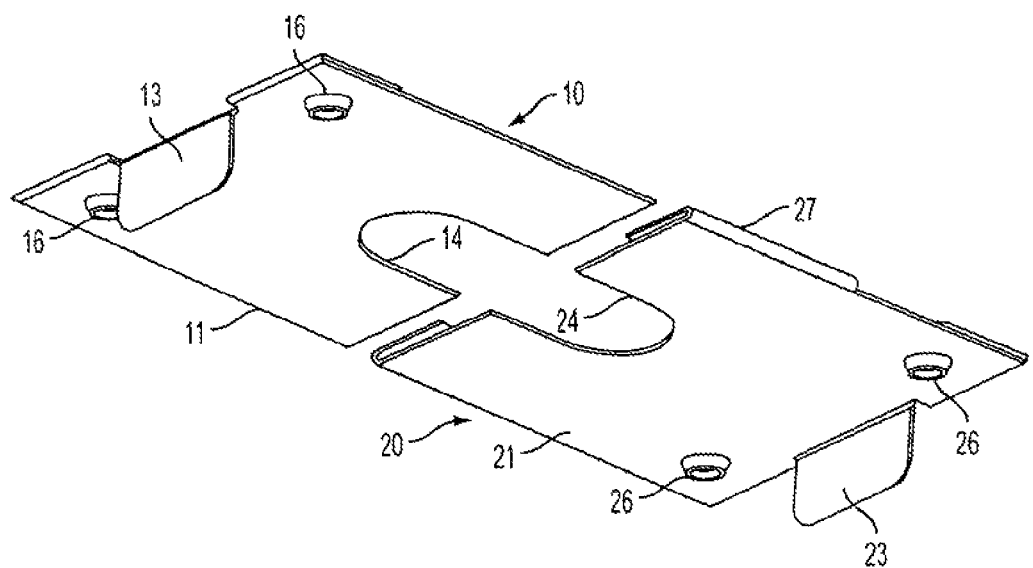
FIG. 2 is a bottom perspective view of the bonding washer of FIG. 1.

Referring to FIGS. 1 and 2, a bonding washer according to the invention comprises a male part 10 and a female part 20, both preferably made of sheet stainless steel. Male part 10 comprises a flat body 11 having two integral ears 12 at one end folded up and back against the body and an integral alignment tab 13 at the same end bent down perpendicular to the body. The opposite end of the body has an open-ended recess or notch 14. Each of the ears 12 has a raised, hollow, circular tooth 15 extending away from the body. The underside of the body (see FIG. 2) also has two raised, hollow, circular teeth 16 extending away from the body. Teeth 15 and 16 are positioned so as to form two sets of aligned, oppositely directed teeth.

Female part 20 similarly comprises a flat body 21 having two ears 22 at one end folded up and back against the body and an integral alignment tab 23 at the same end bent down perpendicular to the body. The opposite end of body 21 has an open-ended recess or notch 24 similar to recess 14 of the male part. Each of the ears 22 has a raised, hollow circular tooth 25 extending away from the body. The underside of the body also has two raised, hollow, circular teeth 26 extending away from the body. Teeth 25 and 26 are positioned so as to form two sets of aligned, oppositely directed teeth. Teeth 15, 16, 25 and 26 preferably are circular as shown but may take any form suitable for penetrating anodic coatings, such as other forms disclosed in U.S. Pat. No. 8,092,129.

Figure 3:
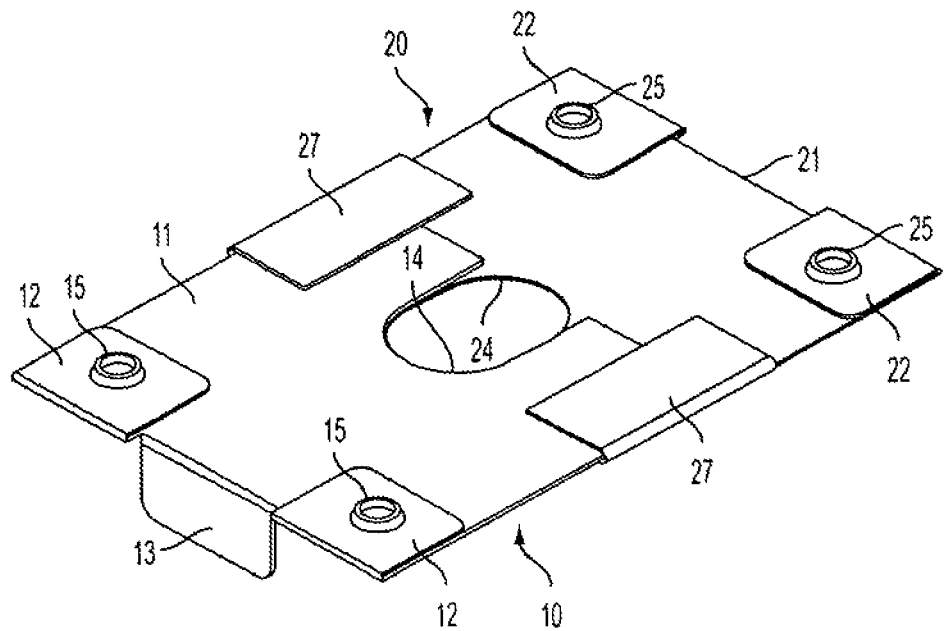
FIG. 3 is a top perspective view of the bonding washer of FIG. 1, showing its parts assembled.
Figure 4:
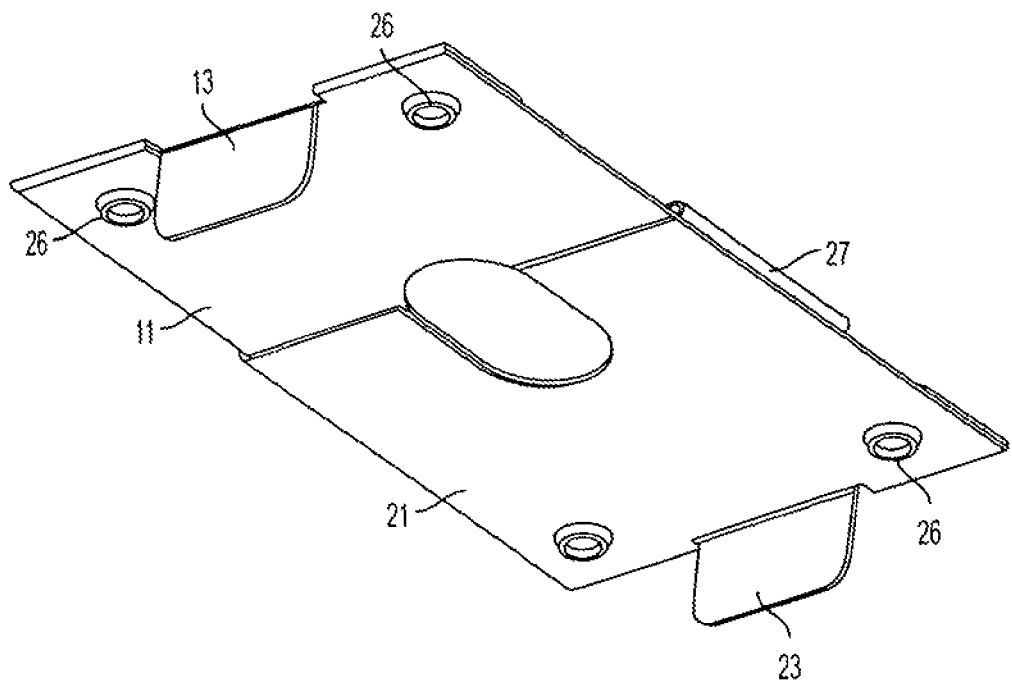
FIG. 4 is a bottom perspective view of the assembly of FIG. 3.

Female part 20 also has an integral flap 27 at each side of the body 21. Each flap 27 is folded up and back over the body substantially parallel to but spaced from it, thereby forming a channel in which the body 11 of male part slides. When mated (see FIGS. 3 and 4), the two notches 14, 24 merge to form an opening of adjustable size through which a fastener can extend when the bonding washer is installed.

Figure 5:
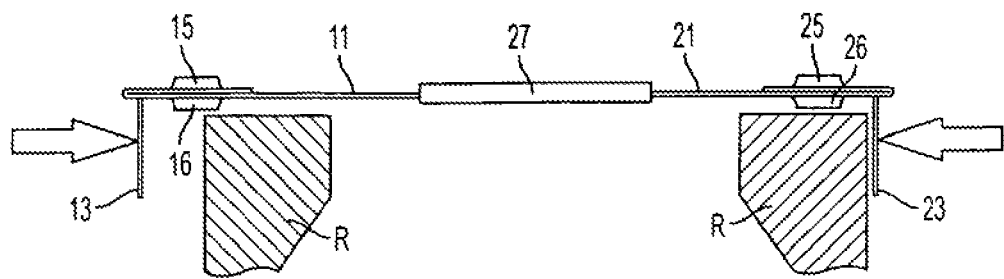
FIG. 5 is a side elevational view of the assembly of FIGS. 3 and 4 as it is being installed on a rail.
Figure 6:
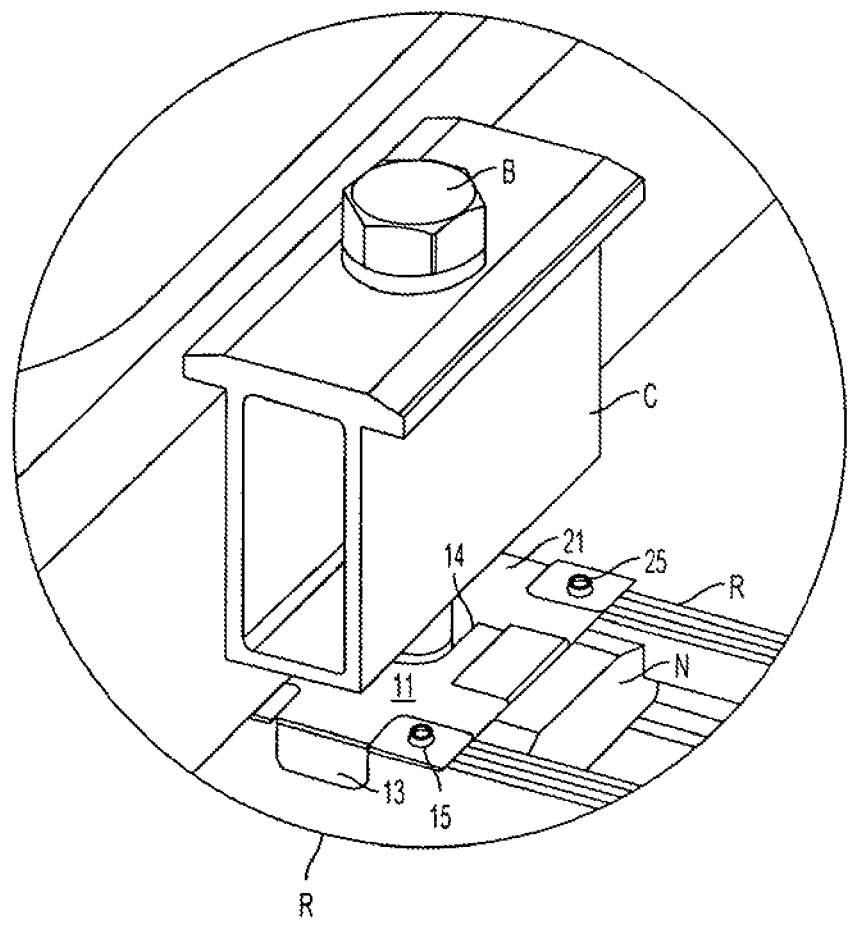
FIG. 6 is a partial perspective view of a partially assembled solar module assembly that includes a bonding washer according to the invention.

FIGS. 5 and 6 show how the bonding washer of the invention can be installed on a metal piece, in this case an aluminum rail R for supporting a photovoltaic panel P. The male and female parts 10, 20 preferably are mated partially before installation with enough space between their respective alignment tabs 13, 23 to accommodate the rail. The assembly is then placed atop the rail and the parts are slid further together until tabs 13, 23 contact the rail R. The panel is then mounted atop the rail and tightly secured by a clamp C and a bolt B, which engages a rail-retained nut N. The exerted clamping force embeds the tips of teeth 15, 16, 25, 26 in the anodic coatings of the rail and the panel. Should flaps 27 contact any of the superposed components, they will be flattened against body 11 of male part 10 and not significantly interfere with the bonding action of the teeth. Nevertheless, it is preferred that upper teeth 15, 25 extend above flaps 27 prior to any deformation of the flaps. This arrangement is present but not easily seen in FIG. 5 due its scale. The same arrangement is present in all disclosed embodiments and is clearly visible in FIG. 8.

Figure 7:
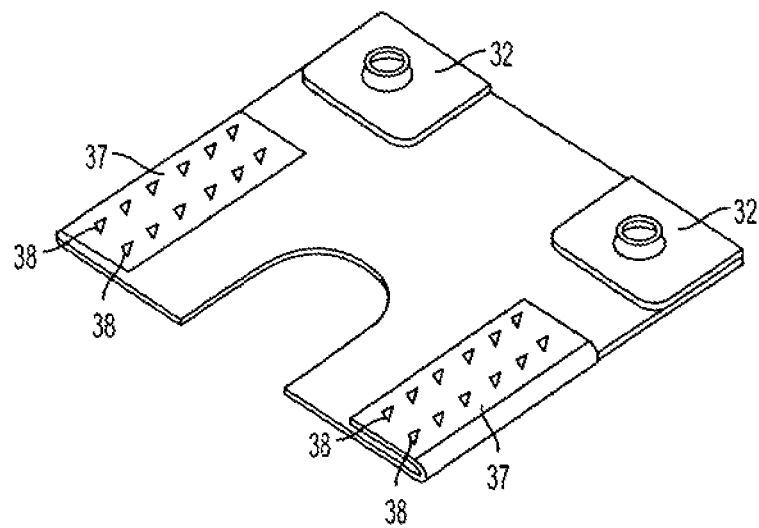
FIG. 7 is a top perspective view of an alternate embodiment of the female part of the bonding washer of the invention.

FIG. 7 shows one alternate configuration of the female part. In this embodiment, flaps 37 are punched to form rows of integral, downwardly directed (interior) teeth 38 that engage and scrape along the body of male part 10 as the parts are telescoped together during installation. This engagement enhances the electrical bond between the parts 10, 20 and keeps them from separating. FIG. 7 shows triangular teeth (visible through triangular punched holes in flaps 37) but they may be of any shape suitable for their intended purpose. Teeth 38 may be raked away from the mating direction to enhance their resistance to separation of the parts.

Figure 8:
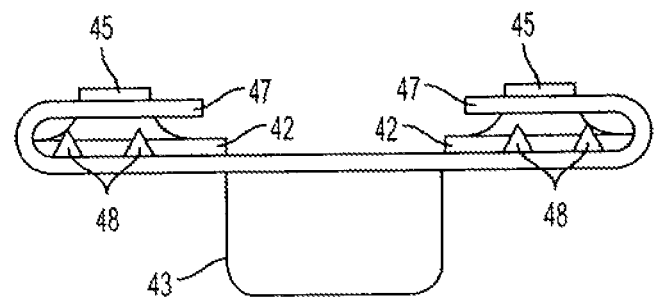
FIG. 8 is an end elevational view of another alternate embodiment of the female part of the bonding washer of the invention.

FIG. 8 shows another alternate configuration for the female part. In this embodiment, interior scraping teeth 48 are integrally formed on body 41 and project upward toward flaps 47. As with the embodiment of FIG. 7, any suitable tooth form and angle is acceptable. Note that teeth 45 on ears 42 project beyond flaps 47, which is the same preferred arrangement for all embodiments.

Figure 9:
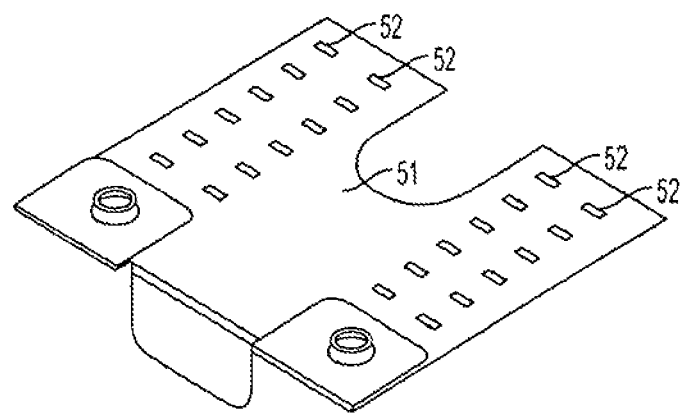
FIG. 9 is a top perspective view of an alternate embodiment of the male part of the bonding washer of the invention.

FIG. 9 shows an alternate configuration for the male part. In this embodiment, the body 51 includes rows of recesses or notches 52 that are sequentially engaged by the teeth of the female part (FIG. 7 or FIG. 8) as the parts are telescoped together. This arrangement effectively resists separation of the parts and is especially effective if the teeth on the female part are raked.

While preferred embodiments have been chosen to illustrate the bonding washer of the invention, it will be understood by those skilled in the art that various changes and modifications may be made without departing from the scope of the invention as defined by the appended claims.

What is claimed is:

1. An adjustable bonding washer for making an electrical connection between two or more metal pieces, the bonding washer comprising:
   an electrically conductive receiving part including a flat body portion with at least two integral flap portions at a first end thereof and forming two or more channels running along a top surface of said flat body portion; and
   an electrically conductive engaging part including a flat body portion with at least two insertion tabs at a first end thereof and respectively engaging said channels of said receiving part and overlapping said top surface of said flat body portion of said receiving part, wherein a hole of decreasing size is created as said insertion tabs increasingly overlap said flat body portion of said receiving part, wherein
   said receiving part further includes at least one retainer on said top surface of said flat body portion for engaging a first metal piece of the metal pieces and at least one retainer on a bottom surface of said flat body portion for engaging a second metal piece of the metal pieces, and
   said engaging part further includes at least one retainer on said top surface of said flat body portion for engaging said first metal piece and at least one retainer on a bottom surface of said flat body portion for engaging said second metal piece.

2. The adjustable bonding washer recited in claim 1, wherein,
   one or more of said at least one retainer of said receiving part is located on a second end of said receiving part opposite said first end thereof, and
   one or more of said at least one retainer of said engaging part is located on a second end of said engaging part opposite said first end thereof.

3. The adjustable bonding washer recited in claim 2, wherein, said at least one retainer on said top surface of said flat body portion and at least one retainer on a bottom surface of said flat body portion of one or more of said receiving and engaging parts include circular teeth extending away from said top and bottom surfaces, respectively, and are directed in opposite directions.

4. The adjustable bonding washer recited in claim 1, wherein,
   said receiving part further includes an integral alignment tab located at said second end of said receiving part and perpendicular said flat body portion, and said engaging part further includes an integral alignment tab located at said second end of said engaging part and perpendicular said flat body portion.

5. The adjustable bonding washer recited in claim 1, wherein each of said receiving and engaging parts further include a notch at the respective first end of said flat body portions and said notches align with each other to create said hole of decreasing size as said insertion tabs increasingly overlap said flat body portion of said receiving part.

6. The adjustable bonding washer recited in claim 1, wherein,
said at least one retainer of said receiving part includes two circular teeth projecting away from said flat body portion of said receiving part, each of said circular teeth of said receiving part being formed on an integral ear formed from the material of said receiving part and parallel to said flat body portion thereof, and
said at least one retainer of said engaging part includes two circular teeth projecting away from said flat body portion of said engaging part, each of said circular teeth of said engaging part being formed on an integral ear formed from the material of said engaging part and parallel to said flat body portion thereof.

7. The adjustable bonding washer recited in claim 1, further comprising a plurality of teeth formed within said channels of said receiving part and a plurality of recesses formed on said insertion tabs, wherein said teeth and said recesses are configured to engage each other when said engaging tabs are inserted into said channels.

8. An adjustable bonding washer for making an electrical connection between two or more metal pieces, the bonding washer comprising:
a substantially flat rectangular body made of electrically conductive material,
a plurality of first retaining members located on a top surface of said rectangular body and a plurality of second retaining members located on a bottom surface of said rectangular body,
at least two tabs located on opposite ends of said rectangular body and being substantially perpendicular to said rectangular body,
at least one channel member located on each side of said rectangular body, and
a hole in said rectangular body, wherein
said hole decreases in size as said at least two tabs on opposite ends of said rectangular body are drawn closer together and said hole increases in size as said at least two tabs are drawn farther apart.

9. An adjustable bonding washer for making an electrical connection between two or more metal pieces, the bonding washer comprising:
an electrically conductive receiving part including a flat body portion with at least two integral flap portions at a first end thereof and forming two or more channels running along a top surface of said flat body portion;
an electrically conductive engaging part including a flat body portion with at least two insertion tabs at a first end thereof and respectively engaging said channels of said receiving part and overlapping said top surface of said flat body portion of said receiving part, wherein a hole of decreasing size is created as said insertion tabs increasingly overlap said flat body portion of said receiving; and
a plurality of teeth formed within said channels of said receiving part and a plurality of recesses formed on said insertion tabs, wherein said teeth and said recesses are configured to engage each other when said engaging tabs are inserted into said channels.

10. An adjustable bonding washer for making an electrical connection between two or more metal pieces, the bonding washer comprising:
an electrically conductive receiving part including a flat body portion with at least two integral flap portions at a first end thereof and forming two or more channels running along a top surface of said flat body portion; and
an electrically conductive engaging part including a flat body portion with at least two insertion tabs at a first end thereof and respectively engaging said channels of said receiving part and overlapping said top surface of said flat body portion of said receiving part, wherein a hole of decreasing size is created as said insertion tabs increasingly overlap said flat body portion of said receiving part, wherein
said receiving part further includes an integral alignment tab located at said second end of said receiving part and perpendicular said flat body portion, and
said engaging part further includes an integral alignment tab located at said second end of said engaging part and perpendicular said flat body portion.

* * * * *